No. 698,370. Patented Apr. 22, 1902.
P. F. M. BURROWS.
COMBINED SCALE AND PENHOLDER.
(Application filed Sept. 7, 1901.)
(No Model.)
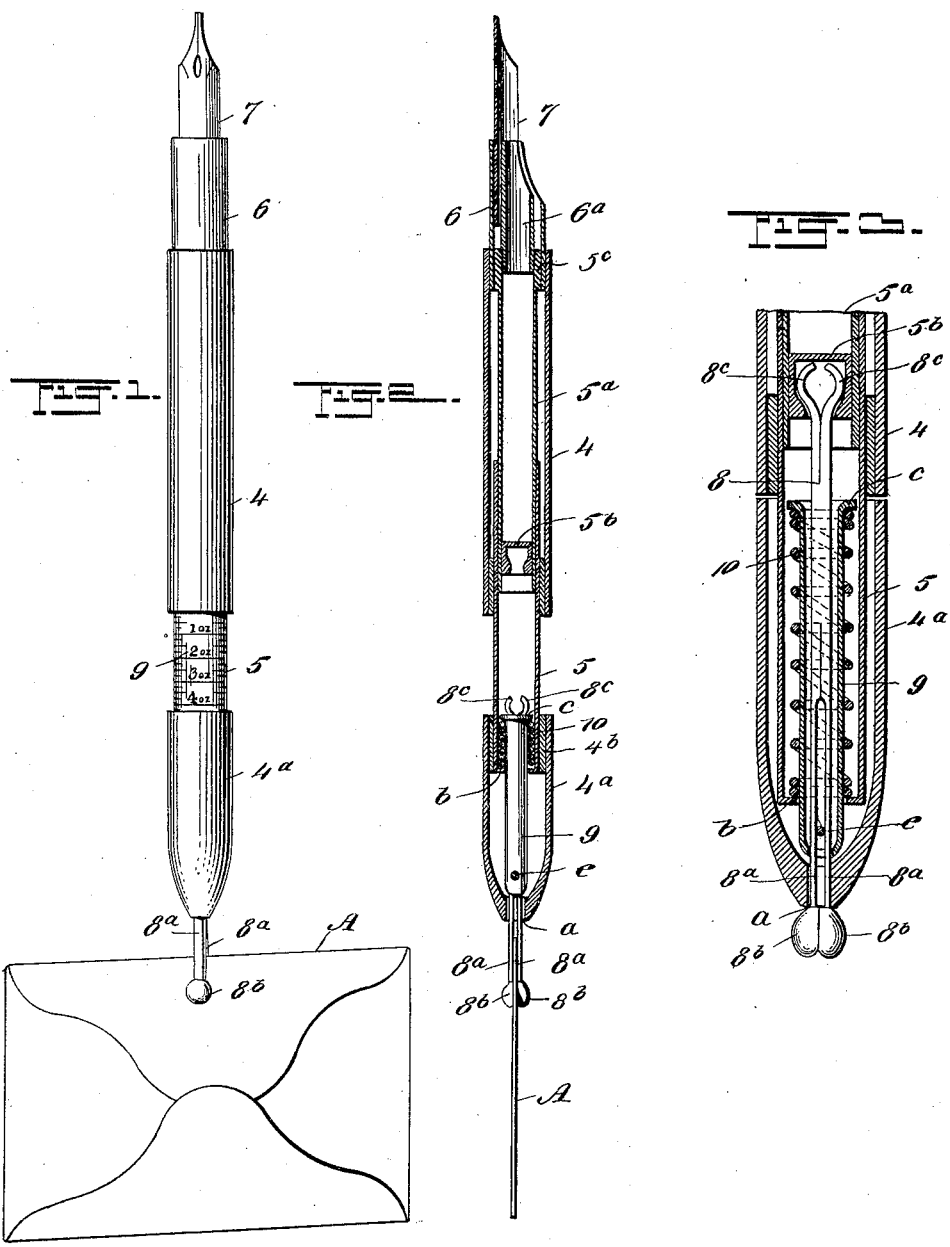
WITNESSES:
INVENTOR
Pierre F. M. Burrows
BY Munn & Co.
ATTORNEYS

UNITED STATES PATENT OFFICE.

PIERRE FINCH MARTINEAU BURROWS, OF HUNTERVILLE, NEW ZEALAND.

COMBINED SCALE AND PENHOLDER.

SPECIFICATION forming part of Letters Patent No. 698,370, dated April 22, 1902.

Application filed September 7, 1901. Serial No. 74,640. (No model.)

*To all whom it may concern:*

Be it known that I, PIERRE FINCH MARTINEAU BURROWS, a subject of the King of Great Britain, and a resident of Hunterville, in the Province of Wellington, New Zealand, have invented new and useful Improvements in a Combined Scale and Pen and Pencil Holder, of which the following is a full, clear, and exact description.

The object of this invention is to provide a simple and very convenient attachment for the weighing of letters or light packages upon the holder or stock of a pen or pencil; and it consists in the novel construction and combination of parts, as is hereinafter described, and defined in the appended claims.

Reference is to be had to the accompanying drawings, forming a part of this specification, in which similar characters of reference indicate corresponding parts in all the figures.

Figure 1 is a side elevation of the improvement in use as a scale for weighing a letter. Fig. 2 is a sectional side view of the device as applied for weighing a letter, and Fig. 3 is an enlarged sectional side view of details showing the scale in retracted adjustment.

In the drawings, 4 indicates the exterior cylindrical body of an ordinary penholder which is truncated to provide a tubular headpiece $4^a$ of equal diameter with the main holder-section, but of less length. One end of the tubular headpiece $4^a$ is contracted, so as to provide a central orifice $a$ at said extremity having less diameter than the internal diameter of the main portion of the headpiece, as shown in Figs. 2 and 3.

A tubular case comprising two sections 5 $5^a$, which have telescopic engagement with each other, is held to slide centrally within the holder-body 4 and headpiece $4^a$, the part 5 of greatest diameter being mainly located in the headpiece $4^a$, but extending into the holder-section 4.

To render the case-sections concentric within the holder-body and headpiece thereof, enlargements $5^c$, $5^d$, and $4^b$ may be introduced between the case-sections 5 $5^a$ and the body portions 4 $4^a$, and these enlargements may either be in the form of sleeves secured within the holder-body at suitable points or they may be integral formations, as may be preferred, the holder-body portion 4, piece $5^d$, and case-section 5 being secured together. The case-section $5^a$, which is fitted so as to slide neatly within the case-section 5, is of such length as will permit it to be held firmly at the front end of the holder-section 4 within an end portion of the tubular pen-clip 6, which is secured in place and projects from the holder-section, as shown in Fig. 2. A smaller tubular pen-clip $6^a$ is held concentrically within the pen-clip 6 by its engagement at one end within the forward end portion of the case-section $5^a$, and thus provides an annular crevice between said clips for retention of the writing-pen 7, which may be of any preferred style.

A slide-bar 8 is provided that is slotted longitudinally from one end toward the center thereof, as at $e'$, thus producing two spaced limbs $8^a$, and for efficiency in service the material of the slide-bar should be of resilient metal, so as to render the limbs measurably resilient. Upon the ends of the limbs $8^a$ similar enlargements $8^b$ are formed or secured, these formations being positioned opposite each other and may have contact.

The case-section 5 is partially closed by an inwardly-extended flange $b$, that is formed at its extremity which is nearest to the contracted end of the headpiece $4^a$, and a core-tube 9 is fitted to slide loosely in the central opening defined by the inner edge of said annular flange $b$.

A weighing-spring 10 of suitable length and tensional strength encircles the core-tube 9 and seats at its lower end upon the flange $b$. At the upper end the spring 10 is engaged by the radial flange $c$, which is formed on an adjacent end of the core-tube, as is clearly shown in Fig. 3.

The limbs $8^a$ of the slide-bar 8 are extended through the contracted end $c'$ of the core-tube 9 that is opposite from that having the flange $c$ thereon, and these limbs are also extended through the opening $a$ in the headpiece $4^a$, so as to locate the enlargements $8^b$ on the ends of said limbs exterior of the headpiece.

A transverse pin or cross-bar $e$ is passed through the headpiece $4^a$ at a suitable distance from its end having the opening *a*, and said cross-bar likewise extends through opposite perforations in the core-tube 9 and through the slot *e'* in the bar 8, it being secured firmly in the headpiece and core-tube, but having a loose engagement with the slide-bar.

The bar 8 is longitudinally slotted at its upper end, providing two limbs which are curved outwardly, upwardly, and toward each other at their upper ends, producing two opposite resilient fingers 8ᶜ, that are of such tensional strength as will permit them to be moved toward each other readily by lateral pressure thereon.

In the case-section 5ᵃ a cylindric keeper-box 5ᵇ is secured at a suitable distance from the upper end of the core-tube 9, having a capacity which will permit expansion of the fingers 8ᶜ therein after they have been inserted through an opening of less diameter than that of the cavity of the box and formed in the lower end wall thereof.

Upon the exterior of the case-section 5 scale-graduations *g* suitable to indicate the weight of a letter or a small package are formed, these increasing in value toward the lower end of the case-section they are marked upon.

The telescopic engagement of the case-sections 5 5ᵃ permits the sliding movement of the lower case-section 5 upon the upper section 5ᵃ, and such a movement will adapt the headpiece 4ᵃ to closely approach the lower end of the case-section 4, as shown in Fig. 3.

When parts of the device are to be reduced in length for convenient carriage in the pocket of a garment, the slide-bar 8 is pressed at the lower end into the headpiece 4ᵃ and the latter is slid toward the holder-section 4. This will cause the curved fingers 8ᶜ to enter the body 5ᵇ and by their expansion lock thereto, and as the enlargements 8ᵇ are now in contact with the contracted end of the headpiece 4ᵃ it will be obvious that the body portion 4 and headpiece 4ᵃ of the device will be held so as to impinge at adjacent ends.

When the device is to be used as a scale for weighing letters or the like, the headpiece of the penholder is pulled upon, which will cause end pressure on the enlargements 8ᵇ and detach the fingers 8ᶜ from the box 5ᵇ. The slide-bar 8 is now drawn upon, so as to seat the expanded fingers 8ᶜ upon the radial flange *c*, and at the same time the cross-bar *e* may impinge upon the upper terminal wall of the slot *e'*. The article to be weighed, such as the letter A, is now inserted between the enlargements 8ᵇ and is gripped by them. The operator now holds the device in an upright position, which will impose the weight of the article held between the ends of the resilient limbs 8ᵃ upon the upper end of the core-tube 9. Now as the core-tube 9 and headpiece 4ᵃ are rigidly connected together by the transverse bar *e*, that may work in the slot *e'* in the bar 8, and the case-section 5 is held to slide in the headpiece 4ᵃ it will be seen that weight hung on the lower end of said bar will tend to compress the spring 10, and consequently slide the case-section 4ᵃ downward on the case-section 5, exposing the graduations on said case-section in accord with the weight. Hence it will be seen that the letter A or a small package gripped by the portions 8ᵇ of the limbs 8ᵃ on the slide-bar 8 will be weighed if the holder-body 4 is upheld while the letter is suspended from the bar.

It will be apparent that removal of weight from the limbs 8ᵃ will permit the spring 10 to expand, which will close the headpiece upon the holder-body portion 4, so as to reduce the length of the penholder, and then the bar 8 may be slid into the holder and held detachably therein, as before explained.

Having thus described my invention, I claim as new and desire to secure by Letters Patent—

1. In a weighing device, the combination with a truncated tubular holder, and a two-part case, one part slidable on the other and having graduations thereon, of a slide-bar supported in one case-section so as to slide and project from one end of the holder, a spring adapted to support the slide-bar and yield when weight is applied to the projected end of said bar, and means to detachably connect the article to be weighed with the said extended end of the bar.

2. In a weighing device, the combination with a truncated holder, and a two-part telescopic case therein, one part of said case having graduations on it, of a slide-bar, a core-tube through which said bar slides, a spring encircling the core-tube and engaging its ends respectively with a flange on the core-tube and with one section of the case, and means to detachably connect the article to be weighed with an end of the slide-bar.

3. In a weighing device, the combination with a truncated tubular holder adapted to receive a pen at one end, and a two-part telescopic case therein, one section of the case having graduations thereon, of a slide-bar, a core-tube flanged at one end and contracted at the opposite end, a coiled spring encircling the core-tube and engaged at its ends respectively with the flange on the core-tube and with a flange on one section of the case, two resilient limbs formed on one end portion of the slide-bar adapted to grip an article to be weighed when said limbs are extended from the holder, and means to hold the slide retracted.

4. In a weighing device, the combination, with a truncated tubular holder adapted to receive a pen at one end, and a two-part telescopic case therein, one section of said case having graduations thereon, of a slide-bar slotted at one end and having enlargements on the free ends of two resilient limbs formed by the slot, two curved resilient fingers at the opposite end of the slide-bar, a keeper-box in one section of the case, adapted to receive and detachably hold the fingers, a core-tube through which the slide-bar may reciprocate, said tube having a radial flange at one end, and a coiled spring encircling the core-tube, 5 and engaged at its ends respectively with the radial flange and with an inturned flange on one end of one case-section.

In testimony whereof I have signed my name to this specification in the presence of two subscribing witnesses.

PIERRE FINCH MARTINEAU BURROWS.

Witnesses:
    P. A. THOULESS,
    RICHARD HOLMES.